United States Patent
Paul (10) Patent No.: US 9,567,902 B2
(45) Date of Patent: Feb. 14, 2017

(54) CONNECTING ROD AND INTERNAL COMBUSTION ENGINE

(71) Applicant: Dr. Ing. h.c. F. Porsche Aktiengesellschaft, Stuttgart (DE)

(72) Inventor: Michael Paul, Weissach (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 190 days.

(21) Appl. No.: 14/600,632

(22) Filed: Jan. 20, 2015

(65) Prior Publication Data
US 2015/0204236 A1    Jul. 23, 2015

(30) Foreign Application Priority Data

Jan. 20, 2014 (DE) .................. 10 2014 100 585

(51) Int. Cl.
 *F02B 75/04*  (2006.01)
 *F16C 7/06*   (2006.01)

(52) U.S. Cl.
CPC ........... *F02B 75/045* (2013.01); *F02B 75/044* (2013.01); *F16C 7/06* (2013.01); *Y10T 74/2151* (2015.01)

(58) Field of Classification Search
CPC ....... F02B 75/044; F02B 75/045; F02B 75/32; F02D 15/02; F16C 7/06
USPC .. 123/48 A, 48 B, 41.37, 78 E, 197.4, 197.3
See application file for complete search history.

(56) References Cited

U.S. PATENT DOCUMENTS

| | | | | |
|---|---|---|---|---|
| 2003/0075125 A1* | 4/2003 | Kreuter | ............... | F02B 75/048 123/78 BA |
| 2014/0014070 A1* | 1/2014 | Lee | ..................... | F02B 75/047 123/48 B |
| 2014/0123957 A1* | 5/2014 | Woo | ..................... | F02B 75/045 123/48 B |

FOREIGN PATENT DOCUMENTS

| | | |
|---|---|---|
| DE | 102 55 299 | 6/2004 |
| DE | 10 2005 055 199 | 5/2007 |
| DE | 10 2010 016 037 | 9/2011 |
| DE | 10 2011 002 138 | 10/2012 |
| DE | 10 2012 014 917 | 2/2013 |
| WO | 2007/043093 | 4/2007 |
| WO | 2010/108582 | 9/2010 |

OTHER PUBLICATIONS

German Search Report of Feb. 4, 2014.

* cited by examiner

*Primary Examiner* — Marguerite McMahon
*Assistant Examiner* — Tea Holbrook
(74) *Attorney, Agent, or Firm* — Gerald E. Hespos; Michael J. Porco; Matthew T. Hespos (57) ABSTRACT

A connecting rod (10) has a big end bearing eye (11) for connection to a crankshaft, a small end bearing eye (12) for connection to a piston of a cylinder, and an eccentric adjustment device (13) for adjusting an effective connecting rod length. The eccentric adjustment device (13) has an eccentric (36) that interacts with an eccentric lever (14), and eccentric rods (15, 16) that the eccentric lever (14). The eccentric lever (14) has segments (38, 39) positioned axially in front of and behind the small end bearing eye (12). Each eccentric lever segment (38, 39) is connected to the eccentric (36) for conjoint rotation. Each eccentric lever segment (38, 39), end faces (43, 44) of the small end bearing eye (10) adjacent the respective eccentric lever segment (38, 39), and (Continued)

adjacent end faces (45, 46) of the eccentric (36) have a beveled contours.

15 Claims, 8 Drawing Sheets

CONNECTING ROD AND INTERNAL COMBUSTION ENGINE

CROSS REFERENCE TO RELATED APPLICATION

This application claims priority under 35 USC 119 to German Patent Appl. No. 10 2014 100 585.6 filed on Jan. 20, 2014, the entire disclosure of which is incorporated herein by reference.

BACKGROUND

1. Field of the Invention

The invention relates to a connecting rod for an internal combustion engine and to an internal combustion engine.

2. Description of the Related Art

Figure 1:
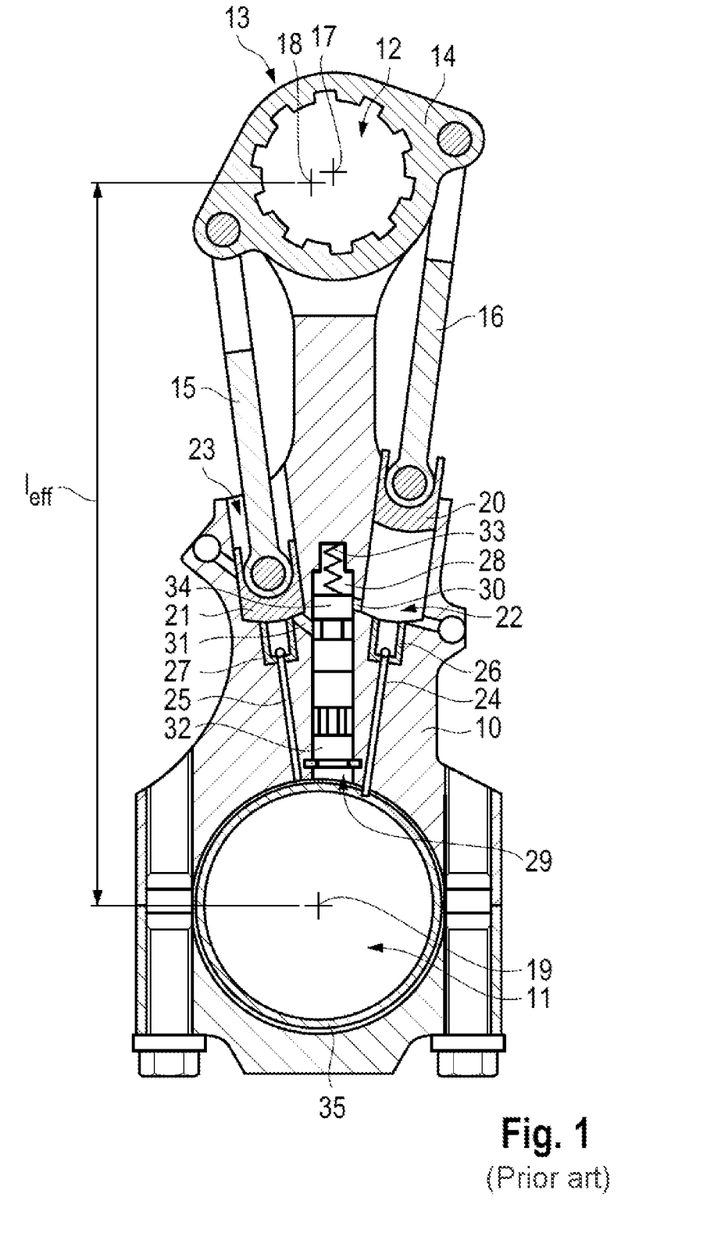
FIG. 1 shows a prior art connecting rod of an internal combustion engine with an adjustable compression ratio.
Figure 2:
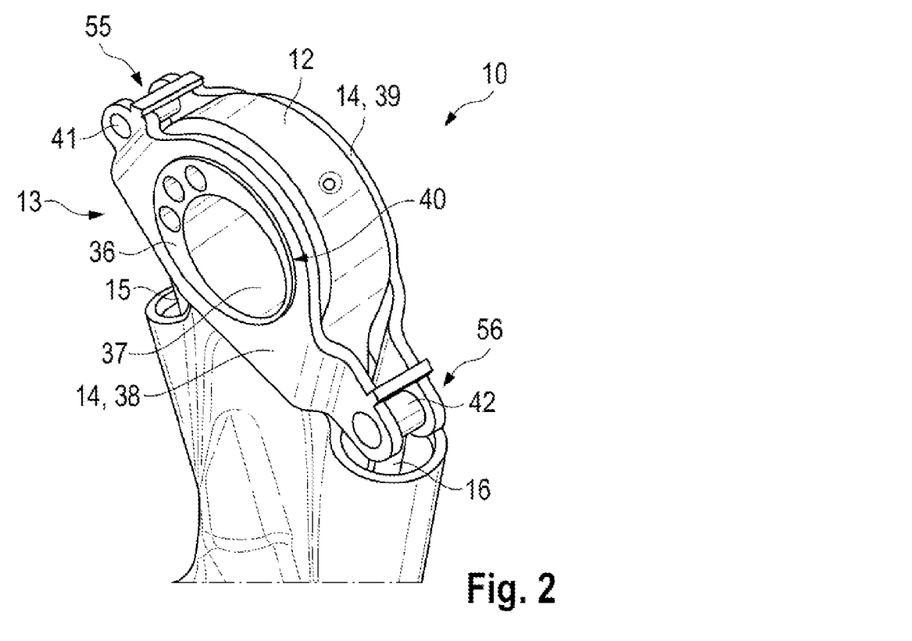
FIG. 2 shows a detail of a connecting rod according to the invention with an adjustable compression ratio, in perspective view.
Figure 3:
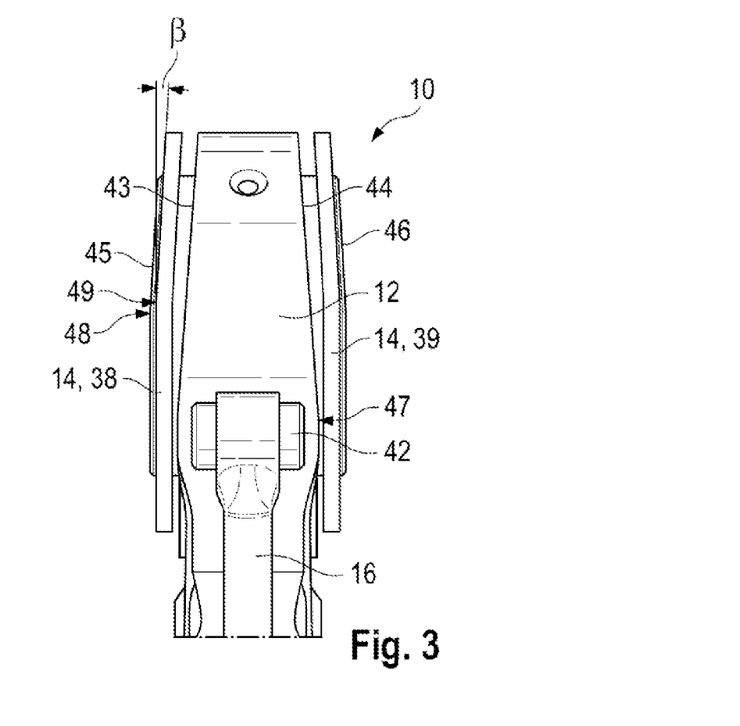
FIG. 3 shows the detail from FIG. 2 from the side, viewed in a radial direction of view.

DE 10 2010 016 037 A1 and FIG. 1 herein show a known connecting rod of an internal combustion engine having an adjustable compression ratio. With reference to FIG. 1, the connecting rod 10 has a big end bearing eye 11 and a small end bearing eye 12. The big end bearing eye 11 is used to connect the connecting rod 10 to a crankshaft (not shown in FIG. 1) and the small end bearing eye 12 is used to connect the connecting rod 10 to a cylinder piston (not shown in FIG. 1) of the internal combustion engine. The connecting rod 10 is assigned an eccentric adjustment device 13, that has an eccentric (not shown in FIG. 1), an eccentric lever 14 and eccentric rods 15, 16. The eccentric lever 14 has a hole arranged eccentrically with respect to a central point 17 of the small end bearing eye 12 and has a central point 18. The hole in the eccentric lever 14 accommodates the eccentric and a hole in the eccentric accommodates a piston pin. The eccentric adjustment device 13 is used to adjust an effective connecting rod length $l_{eff}$, where the connecting rod length is to be taken to mean the distance between the central point 18 of the hole in the eccentric lever 14 and a central point 19 of the big end bearing eye 11. The eccentric rods 15, 16 can be moved to turn the eccentric body 14 and hence change the effective connecting rod length $l_{eff}$. Each eccentric rod 15, 16 is assigned a piston 20, 21 that is guided movably in a hydraulic chamber 22, 23. A hydraulic pressure prevails in the hydraulic chambers 22, 23 and acts on the pistons 20, 21 assigned to the eccentric rods 15, 16. Thus, repositioning of the eccentric rods 15, 16 is possible or not possible, depending on the quantity of oil in the hydraulic chambers.

Adjustment of the eccentric adjustment device 13 is initiated by action of inertia forces and load forces of the internal combustion engine acting on the eccentric adjustment device 13 during a power stroke of the internal combustion engine. The directions of action of the forces acting on the eccentric adjustment device 13 are constant during a power stroke. Hydraulic oil acts on the pistons 20, 21 and the pistons act on the eccentric rods 15, 16 to assist the adjusting movement. The pistons 20, 21 prevent resetting of the eccentric adjustment device 13 due to variations in the directions of action of the forces acting on the eccentric adjustment device 13. The eccentric rods 15, 16 interact with the pistons 20, 21 and are connected to each end of the eccentric body 14. The hydraulic chambers 22 and 23 in which the pistons 20, 21 are guided can be supplied with hydraulic oil via hydraulic oil lines 24 and 25, starting from the big end bearing eye 11. Check valves 26 and 27 prevent the hydraulic oil from flowing back out of the hydraulic chambers 23 and 24 into the hydraulic lines 24 and 25. A changeover valve 29 is accommodated in a hole 28 in the connecting rod 10. The operating position of the changeover valve 29 determines which of the hydraulic chambers 22 and 23 is filled with hydraulic oil and which of the hydraulic chambers 22 and 23 is emptied, with the direction of adjustment or direction of rotation of the eccentric adjustment device 13 depending thereon. In this arrangement, the hydraulic chambers 22 and 23 are in communication via fluid lines 30 and 31, respectively, with the hole 28 accommodating the changeover valve 29. An actuating means 32, a spring device 33 and a control piston 34 of the changeover valve 29 are shown schematically in FIG. 1, and the operation of these component elements of the changeover valve 29 is known from DE 10 2010 016 037 A1.

As explained above, the hydraulic oil that acts on the pistons 20, 21 guided in the hydraulic chambers 22, 23 is fed to the hydraulic chambers 22, 23, starting from the big end bearing eye 11, via hydraulic lines 24 and 25. The connecting rod 10 engages by means of the big end bearing eye 11 on the crankshaft (not shown in FIG. 1) in such a way that a connecting rod bearing shell 35 is arranged between the crankshaft, namely a crankshaft bearing journal thereof, and the big end bearing eye.

DE 10 2005 055 199 A1 discloses further details of an internal combustion engine with an adjustable compression ratio. More particularly, this prior art discloses inserting the eccentric lever on which the eccentric rods engage into a slot-type aperture in the small end bearing eye. The eccentric lever has a hole with internal toothing and is inserted into the slot-type aperture in the small end bearing eye. The eccentric has external toothing and is inserted into the hole in the eccentric lever. The eccentric and the eccentric lever are connected to one another by the intermeshing teeth. Connecting the eccentric to the eccentric lever by the intermeshing teeth requires a high outlay on production and assembly and is susceptible to wear.

It is an object of the invention to provide an internal combustion engine and a connecting rod with low production and assembly costs, improved wear, and a low weight.

SUMMARY OF THE INVENTION

The invention relates to a connecting rod with an eccentric lever that has at least one eccentric lever segment. The eccentric lever segment is positioned in front of and/or behind the small end bearing eye, as seen in the axial direction of the eccentric. The or each eccentric lever segment is connected for conjoint rotation to the eccentric. The or each eccentric lever segment, an end face positioned adjacent to the respective eccentric lever segment of the small end bearing eye, and an adjacent end face of the eccentric each have a beveled contour. Thus, the eccentric can be connected in a simple manner to the or to each eccentric lever segment and tooth systems on the eccentric and on the eccentric lever are not needed. Thus, a low weight is achieved while reducing the outlay on production and assembly and susceptibility to wear.

The eccentric lever may have at least one eccentric lever segment. The or each eccentric lever segment may be positioned in front of and/or behind the small end bearing eye, as seen in the axial direction of the eccentric and may be connected for conjoint rotation to the eccentric. An end of each eccentric lever segment that is connected to the eccentric rods has a contour indented in the direction of the eccentric rods. Thus, the eccentric can be connected easily to the or to each eccentric lever segment of the eccentric lever. Accordingly, the tooth systems on the eccentric and on the eccentric lever can be dispensed with, thereby achieving a low weight, with a reduced outlay on production and assembly and improved wear.

The eccentric lever may have two eccentric lever segments. A first eccentric lever segment may be positioned in front of a first axial end face of the small end bearing eye and a second eccentric lever segment may be positioned in front of a second axial end face of the small end bearing eye so that the small end bearing eye is positioned between the two eccentric lever segments.

The two end faces of the small end bearing eye, the two end faces of the eccentric and the two eccentric lever segments may extend parallel to one another in a lower section thereof and obliquely to one another in an upper section thereof for further reducing the weight of the connecting rod.

The entire adjustment range of the eccentric lever may be configured so that inflection lines in the contour of the eccentric lever segments at which the mutually parallel sections of the eccentric lever segments merge into the mutually oblique sections of the eccentric lever segments may lie above inflection lines in the contour of the axial end faces of the small end bearing eye at which the mutually parallel sections of the end faces of the small end bearing eye merge into the mutually oblique sections of the end faces of the small end bearing eye. The inflection lines in the contour of the eccentric lever segments and inflection lines in the contour of the axial end faces of the eccentric preferably extend directly adjacent to one another. It is thereby possible to ensure good rotatability of the eccentric lever combined with low weight of the connecting rod.

The eccentric lever segments positioned in front of the two end faces of the small end bearing eye have, at their ends, via which they are connected to the eccentric rods, an indented contour, reducing the distance between the eccentric lever segments. Thus, the weight of the connecting rod can be further reduced.

Indentation lines at ends of the eccentric lever segments preferably are configured so that when an eccentric rod engaging on ends of the eccentric lever segments has entered to the maximum extent into the respective hydraulic chamber, the indentation lines formed at this end of the eccentric lever segments extend parallel to a connecting-rod main body contour facing the respective eccentric rod. Thus, good rotatability of the eccentric lever and a low weight of the connecting rod are achieved.

DETAILED DESCRIPTION

An internal combustion engine with an adjustable compression ratio has at least one, preferably several, cylinders. Each cylinder has a piston that is coupled by a connecting rod 10 to a crankshaft of the internal combustion engine.

One end of each connecting rod 10 has a small end bearing eye 12 and an opposite end has a big end bearing eye 11. The big end bearing eye 11 of each connecting rod 10 engages on a crankshaft bearing journal of the crankshaft so that a connecting rod bearing shell is positioned between the crankshaft bearing journal and the big end bearing eye, and a lubricating oil film can build up between the connecting rod bearing shell and the crankshaft bearing journal.

An internal combustion engine with an adjustable compression ratio has an eccentric adjustment device 13 in the region of each connecting rod 10 for adjusting the effective connecting rod length of the respective connecting rod 10. The eccentric adjustment device 13 has an eccentric 36, an eccentric lever 14 and eccentric rods 15, 16 that can be moved in accordance with a hydraulic pressure prevailing in hydraulic chambers interacting with the eccentric rods to adjust the compression ratio. The hydraulic chambers interacting with the eccentric rods 15, 16 can be supplied with hydraulic oil, starting from the big end bearing eye 11 of the respective connecting rod. Adjustment of the eccentric adjustment device is initiated by the action of inertia forces and load forces of the internal combustion engine.

The eccentric lever 14 has a hole for accommodating the eccentric 36, and the eccentric 36 has a hole 37 that accommodates a piston pin. The eccentric lever 14 has at least one eccentric lever segment and in the illustrative embodiments shown has two eccentric lever segments 38 and 39 positioned respectively on opposite front and rear sides of the small end bearing eye, as seen in the axial direction of the eccentric 36. Thus, the small end bearing eye 12 is between the two eccentric lever segments 38, 39.

Figure 8:
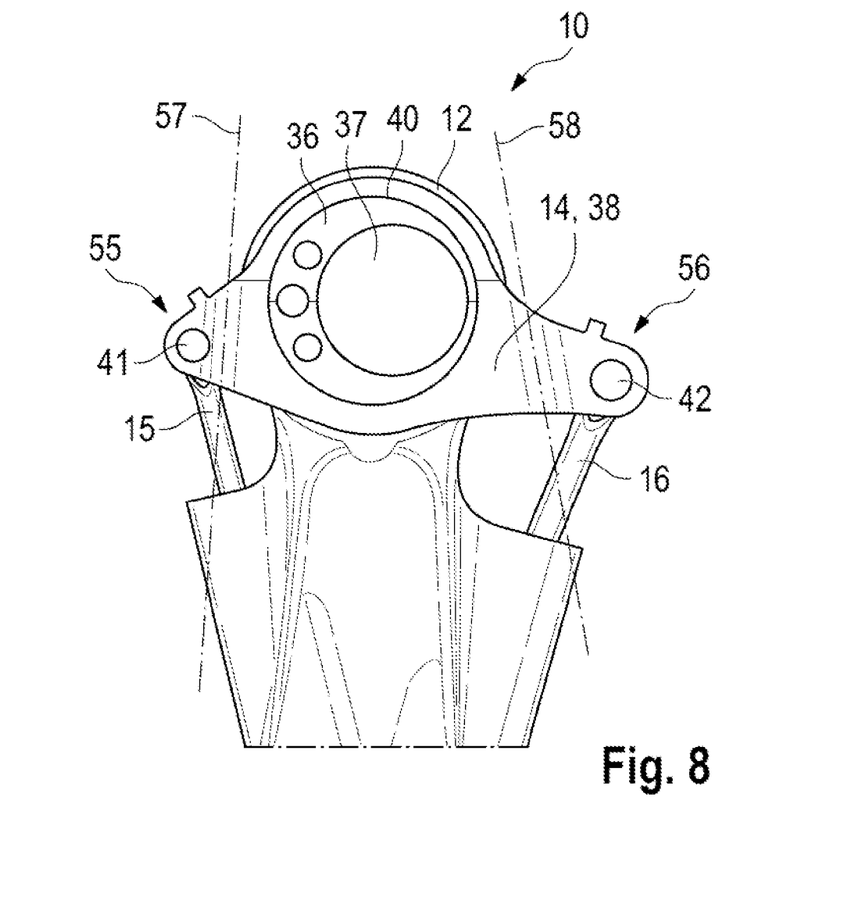
FIG. 8 shows the detail from FIG. 2 from the front in an axial direction of view with the eccentric lever.
Figure 9A:
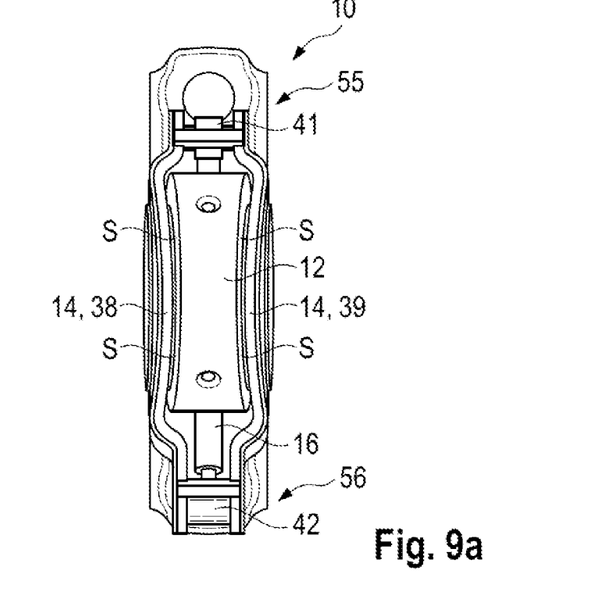
FIGS. 9a, 9b show a view from above in a radial direction of view and a view from the front in an axial direction of view in a radial direction of view of a connecting rod according to the invention in a first state.
Figure 9B:
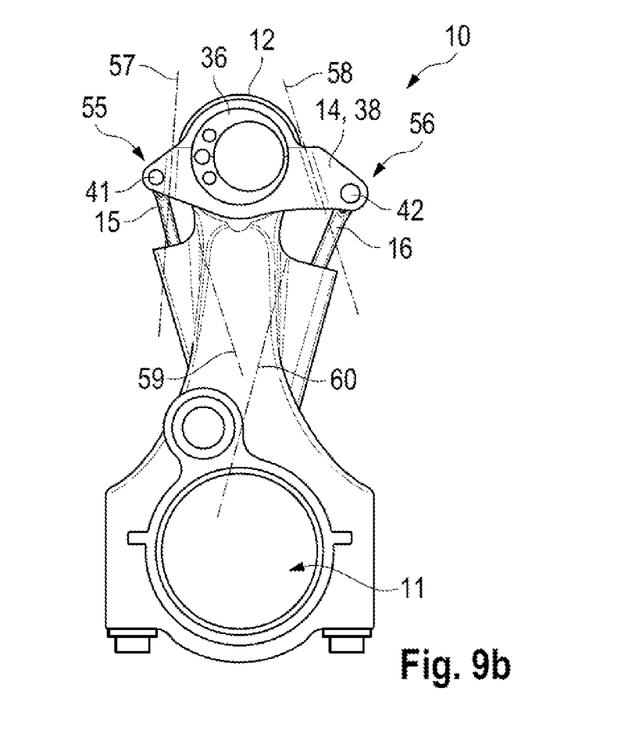

The eccentric lever segments 38, 39 of the eccentric lever 14 are connected to the eccentric 36 for conjoint rotation. A connecting region 40 between the eccentric lever segment 38 and the eccentric 36 runs in the circumferential direction of the eccentric 36, and is shown in dashed lines in FIG. 8. The eccentric 36 and the eccentric lever segment 38 of the eccentric lever 14 preferably are connected by welding in the connecting region 40. The eccentric lever segments 38, 39 are positioned in front of and behind the small end bearing eye 12, as seen in the axial direction of the eccentric 36, and the eccentric 36 is connected to both eccentric lever segments 38 and 39.

In the illustrated embodiment, the two eccentric lever segments 38, 39 of the eccentric lever 14 are connected to one another at lateral ends by connecting pins 41, 42. The eccentric rods 15, 16 engage on the connecting pins 41, 42 in an articulated manner to form hinge joints between the eccentric rods 15, 16 and the connecting pins 41, 42 that connect the two eccentric lever segments 38, 39. A ball joint also is conceivable instead of connection by the connecting pins 41, 42.

In contrast to the illustrated embodiment, the eccentric lever 14 can be an integral or unitary component with the eccentric lever segments 38, 39 formed integrally or unitarily. The eccentric rods 15, 16 then engage in an articulated manner on ends of the integral or unitary eccentric lever 14 by connecting pins 41, 42 to form hinge joints. The two eccentric rods 15, 16 also can engage the opposite ends of the integral or unitary eccentric lever 14 by ball joints.

The eccentric 36 is inserted through holes in the eccentric lever segments 38, 39 and a hole in the small end bearing eye 12. The eccentric 36 preferably is connected to both eccentric lever segments 38, 39 of the eccentric lever 14 by welding, thereby making possible advantageous torque transmission.

The eccentric lever 14 is no longer inserted into a slotted aperture in the connecting rod 10 but, instead, the eccentric lever segments 38, 39 of the eccentric lever 14 are positioned in front of and behind the connecting rod 10, as seen in the axial direction of the eccentric 36. As a result, the small end bearing eye 12 of the connecting rod 10 is positioned between the two eccentric lever segments 38, 39.

The first eccentric lever segment 38 is positioned in front of a first axial end face 43 of the small end bearing eye 12, and the second eccentric lever segment 39 is positioned in front of a second axial end face 44 of the small end bearing eye 12.

The eccentric lever segments 38 and 39 of the eccentric lever 14, the end faces 43 and 44 of the small end bearing eye 12, which are positioned adjacent to the respective eccentric lever segments 38, 39, and end faces 45 and 46 of the eccentric 36 all have beveled contours to achieve aA low weight for the connecting rod 10.

Figure 6:
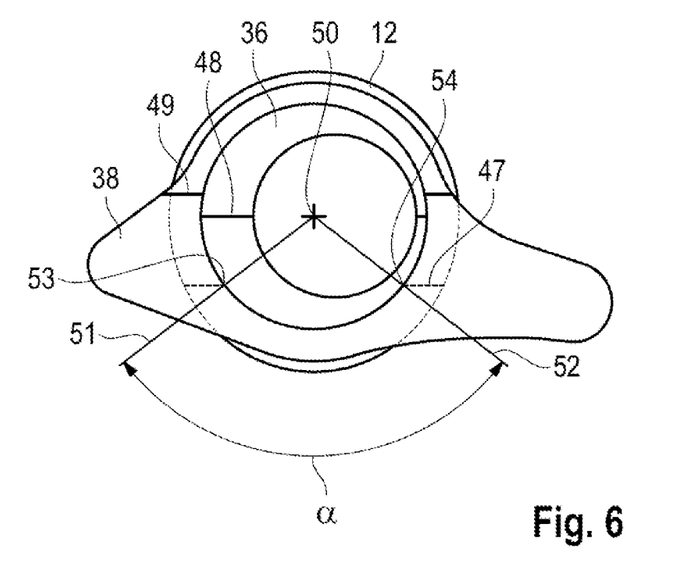
FIG. 6 shows another detail of the connecting rod according to the invention in a first state.
Figure 7:
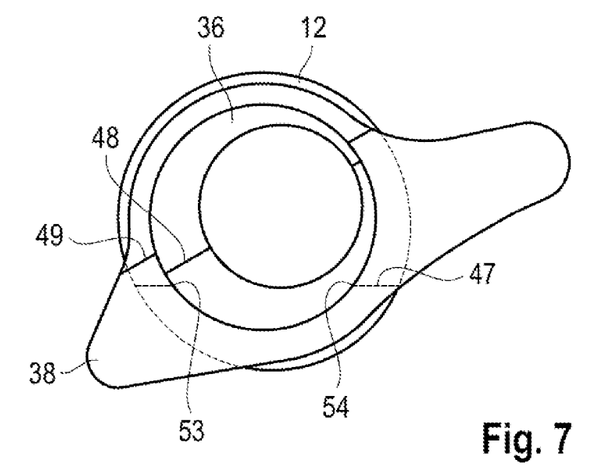
FIG. 7 shows the detail from FIG. 6 in a second state.

The two end faces 43 and 44 of the small end bearing eye 12 have a contour beveled so that the two end faces 43 and 44 extend parallel or almost parallel to one another in a lower section, but extend oblique to one another and trapezoidally in an upper section. An inflection line 47 is shown for one of the two end faces 43 or 44 of the small end bearing eye 12 in FIGS. 6 and 7. The two end faces 43 and 44 of the small end bearing eye 12 extend parallel to one another below the line 47, and the two end faces 43 and 44 of the small end bearing eye 12 extend obliquely toward one another above the line 47.

The two end faces 45 and 46 of the eccentric 36 have a contour bevel so that the end faces 45 and 46 are parallel to one another in a lower section and extend obliquely or trapezoidally toward one another in an upper section. An inflection line 48 is shown for one of the two end faces 45 and 46 of the eccentric 36 in FIGS. 6 and 7. The end faces 45 and 46 of the eccentric 36 are parallel to one another below the line 48 and extend obliquely toward one another above the line 48.

The two eccentric lever segments 38 and 39 of the eccentric lever 14 are connected for conjoint rotation to the eccentric 36, and have a contour bevel so that they extend parallel to one another in a lower section and obliquely or trapezoidally to one another in an upper section. An inflection line 49, at which the lower and upper sections merge, is shown FIGS. 6 and 7 for one of the eccentric lever segments 38 and 39.

The inflection lines 49 at which the parallel sections of the eccentric lever segments 38, 39 merge into the oblique sections of the eccentric lever segments 38, 39, lie above the inflection lines 47 at which the parallel sections of the end faces 43, 44 of the small end bearing eye 12 merge into the oblique sections of the end faces 43, 44 of the small end bearing eye 12, in each rotational position of the eccentric lever segments 38 and 39 and hence in the entire adjustment range of the eccentric lever 14. This is advantageous for optimum rotatability of the eccentric lever segments 38 and 39 relative to the small end bearing eye 12. The eccentric lever 14 will not jam over the entire adjustment range, and there is sufficient clearance S between the small end bearing eye 12 and the eccentric lever 14.

Figure 5:
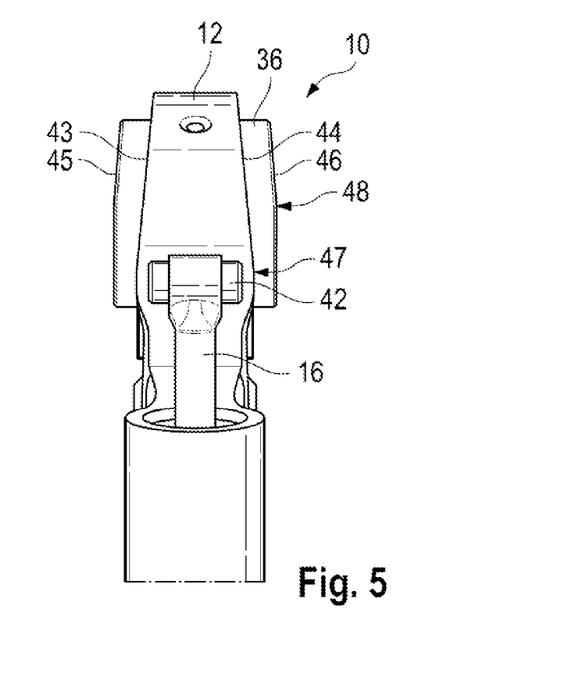
FIG. 5 shows the detail from FIG. 4 from the side in a radial direction of view.

The inflection lines 47 at which the parallel sections of the end faces 43, 44 of the small end bearing eye 12 merge into the oblique sections thereof lie below a central point 50 of the eccentric 36 that is rotatable in the small end bearing eye 12. At the maximum, the inflection lines 47 in the contour of the axial end faces 43, 44 of the small end bearing eye 12 are so far below the central point 50 of the eccentric 36 that straight lines 51 and 52 that extend through the central point 50 of the eccentric 36 and through the inflection points 53 and 54 of the inflection lines 47 in the contour of the axial end faces 43, 44 of the small end bearing eye 12 that directly adjoin the eccentric 36 enclose an angle α (see FIGS. 5 and 6) of at least 80°. These straight lines 51 and 52 preferably enclose an angle α of at least 100°, particularly preferably an angle α of at least 120°. The angle α is at most 160°, preferably at most 150°, particularly preferably at most 140°. Accordingly, $80° \leq \alpha \leq 160°$, preferably $100° \leq \alpha \leq 150°$, particularly preferably $120° \leq \alpha \leq 140°$.

Figure 4:
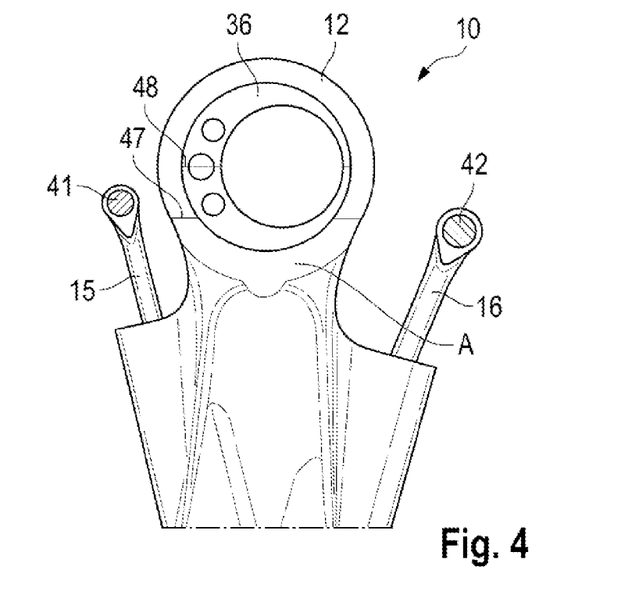
FIG. 4 shows the detail from FIG. 2 from the front in an axial direction of view without the eccentric lever.

By virtue of the above arrangement of the inflection lines 47 in the contour of the axial end faces 43, 44 of the small end bearing eye 12, a sufficiently large area A (see FIG. 4) for axial support of the eccentric lever segments 38, 39 and for introduction of force is formed on the axial end faces 43, 44 of the small end bearing eye 12.

The inflection lines 48 in the contour of the axial end faces 45, 46 of the eccentric 36 and the inflection lines 49 in the contour of the eccentric lever segments 38, 39 extend directly adjacent to one another. As can best be seen in FIGS. 6 and 7, the inflection lines 48 in the contour of the axial end faces 45, 46 of the eccentric 36 extend directly below the inflection lines 49 in the contour of the eccentric lever segments 38, 39 in the illustrated embodiment.

It is also possible that the inflection lines 48 in the contour of the axial end faces 45, 46 of the eccentric 36 extend directly above the inflection lines 49 in the contour of the eccentric lever segments 38, 39 or that, as seen in a vertical direction, these inflection lines 48 and 49 coincide or are situated in one vertical position.

In each case, optimum connection of the eccentric lever segments 38, 39 for conjoint rotation to the eccentric 36 is possible in the connecting regions 40.

Inflection angles of the end faces 43, 44 of the small end bearing eye 12 preferably correspond to inflection angles of the end faces 45, 46 of the eccentric 36.

The inflection angles of the end faces 45, 46 of the eccentric 36 preferably also correspond to the inflection angles of the eccentric lever segments 38, 39.

The inflection angles of the end faces 43, 44 of the small end bearing eye 12 preferably correspond to the inflection angles of the eccentric lever segments 38, 39.

Optimum rotatability of the eccentric lever segments 38 and 39 relative to the small end bearing eye 12 and optimum connection of the eccentric lever segments 38, 39 for conjoint rotation to the eccentric 36 are possible by virtue of the above configuration of the inflection angles. Moreover, a load-bearing width of the eccentric 36 relative to the piston pin is at a maximum when the inflection angles of the end faces 45, 46 of the eccentric 36 correspond to the inflection angles of the eccentric lever segments 38, 39. Even when the eccentric 36 is rotated fully, the eccentric 36 bears on the piston pin over the full width of the eccentric 36 in the direction of action of the piston force.

The eccentric lever 14 will not jam over the entire adjustment range, and there is sufficient clearance S between the small end bearing eye 12 and the eccentric lever. Moreover, a defined axial clearance can be established during the connection of the eccentric lever segments 38, 39 to the eccentric 36.

According to a second aspect of the invention, the eccentric lever segments 38, 39 positioned in front of both end faces 43, 44 of the small end bearing eye 12 have an indented contour at the ends 55, 56 that are connected in an articulated manner to the eccentric rods 15, 16 by the connecting pins 41, 42, reducing the distance between the eccentric lever segments 38, 39. Thus, a low weight of the connecting rod 10 can be achieved.

Indentation lines 57, 58 define locations where the indented contour of the ends 55, 56 of the eccentric lever segments 38, 39 begins. The indentation lines 57, 58 are configured so that when an eccentric rod 15, 16 engaged on the end 55, 56 of the eccentric lever segment 38, 39 has entered to the maximum extent into the respective hydraulic chamber 22, 23, the indentation line 57 58, formed at this end 55, 56, of the eccentric lever segments 38, 39 extends parallel to a connecting-rod main body contour 59, 60 facing the respective eccentric rod 15, 16.

Figure 10A:
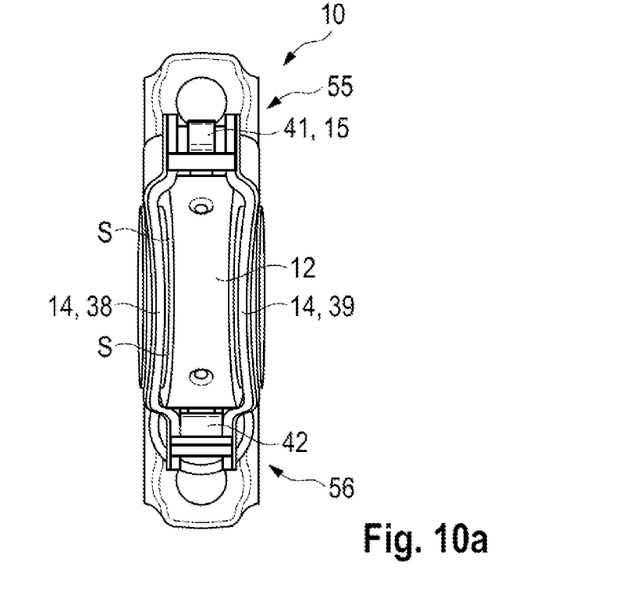
FIGS. 10a and 10b show the views from FIGS. 9a, 9b in a second state.
Figure 10B:
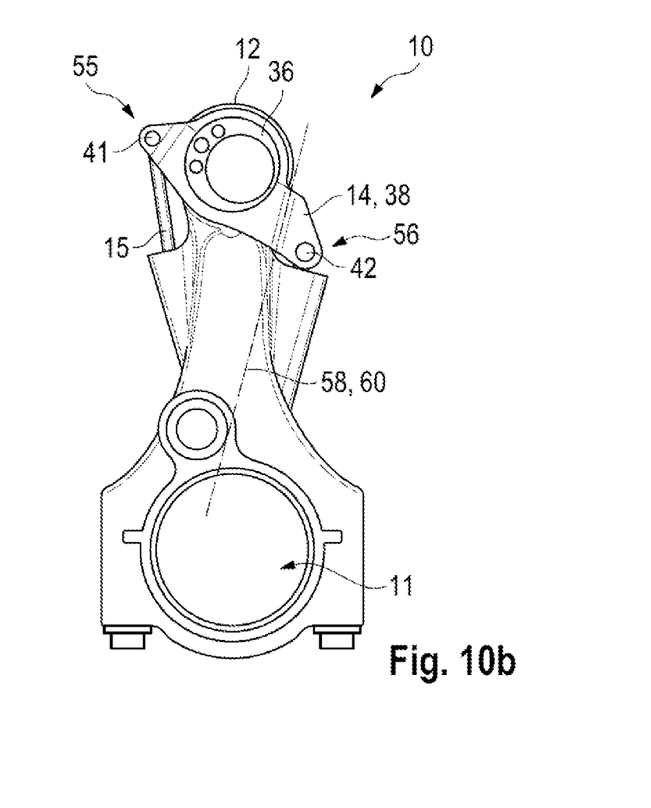
Figure 11A:
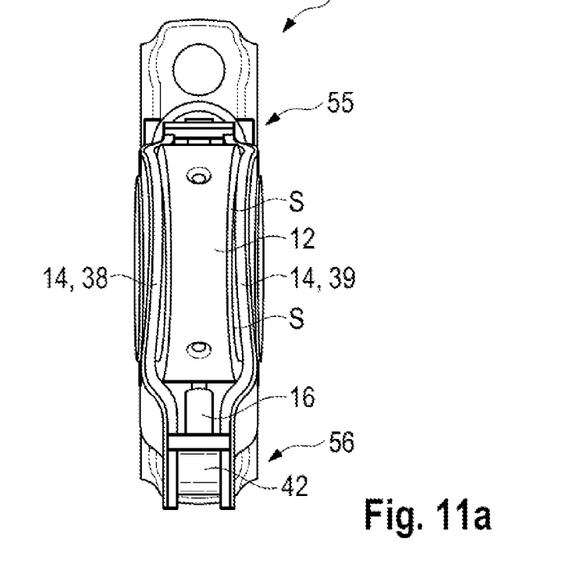
FIGS. 11a and 11b show the views from FIGS. 9a, 9b in a third state.
Figure 11B:
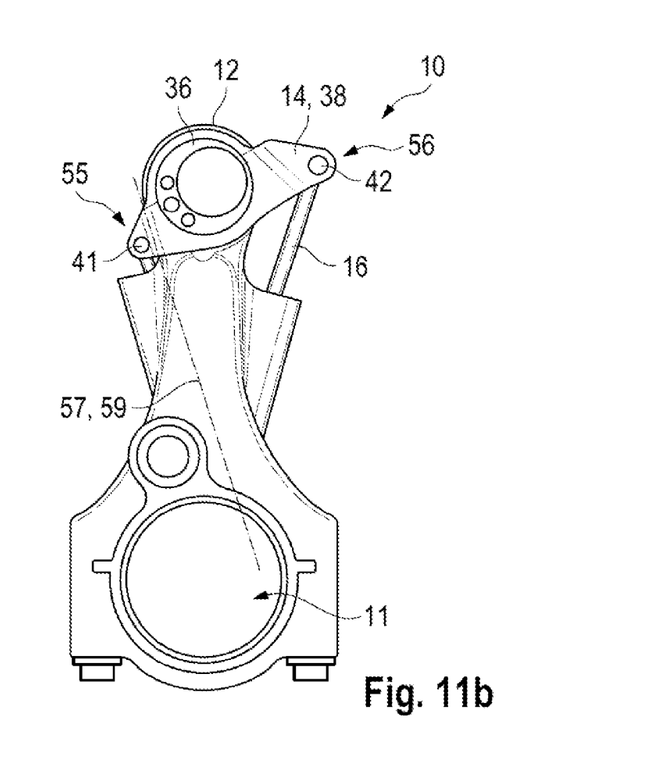

Accordingly, the indentation of the ends 55, 56 of the eccentric lever segments 38, 39 is implemented so that the indentation contour extends approximately parallel to the connecting-rod main body contours 59, 60 at the maximum pivoting angle (see FIGS. 10b, 11b). Thus, there is no risk of collision between the eccentric lever segments 38, 39 and the main body of the connecting rod over the adjustment range of the eccentric lever 14.

What is claimed is:

1. A connecting rod, comprising a big end bearing eye for connection to a crankshaft, a small end bearing eye for connection to a piston of a cylinder, and an eccentric adjustment device for adjusting an effective connecting rod length, the eccentric adjustment device having an eccentric that interacts with an eccentric lever, and eccentric rods that engage on the eccentric lever, the eccentric lever having at least one eccentric lever segment positioned in front of and/or behind the small end bearing eye, as seen in an axial direction of the eccentric, the eccentric lever segment being connected to the eccentric for conjoint rotation, an end face of the small end bearing eye positioned adjacent to the respective eccentric lever segment and an adjacent end face of the eccentric each have a beveled contour.

2. The connecting rod of claim 1, wherein the eccentric lever has a first eccentric lever segment positioned in front of a first axial end face of the small end bearing eye and a second eccentric lever segment positioned in front of a second axial end face of the small end bearing eye, so that the small end bearing eye is between the two eccentric lever segments, wherein the two end faces of the small end bearing eye extend parallel to one another in a lower section thereof and obliquely to one another in an upper section thereof.

3. The connecting rod of claim 2, wherein the first and second eccentric lever segments are connected to the eccentric for conjoint rotation and are parallel to one another in a lower section and obliquely to one another in an upper section.

4. The connecting rod of claim 3, wherein the end faces of the eccentric extend parallel to one another in a lower section thereof and oblique to one another in an upper section thereof.

5. The connecting rod of claim 4, wherein inflection lines in the contour of the axial end faces of the eccentric and inflection lines in the contour of the eccentric lever segments extend directly adjacent to one another.

6. The connecting rod of claim 3, wherein inflection lines at which the parallel sections of the eccentric lever segments merge into the oblique sections of the eccentric lever segments lie above inflection lines at which the parallel sections of the end faces of the small end bearing eye merge into the oblique sections of the end faces of the small end bearing eye over an entire adjustment range of the eccentric lever.

7. The connecting rod of claim 2, wherein inflection lines at which the parallel sections of the end faces of the small end bearing eye merge into the oblique sections thereof are below a central point of the eccentric.

8. The connecting rod of claim 7, wherein the maximum amount by which the inflection lines in the contour of the axial end faces of the small end bearing eye lie below the central point of the eccentric is such that straight lines that extend through the central point of the eccentric and through inflection points of the inflection lines in the contour of the axial end faces of the small end bearing eye that directly adjoin the eccentric enclose an angle of at least 80°.

9. The connecting rod of claim 8, wherein inflection angles of the end faces of the small end bearing eye and inflection angles of the end faces of the eccentric correspond to one another.

10. The connecting rod of claim 8, wherein inflection angles of the end faces of the eccentric and inflection angles of the eccentric lever segments correspond to one another.

11. The connecting rod of claim 8, wherein inflection angles of the end faces of the small end bearing eye and inflection angles of the eccentric lever segments correspond to one another.

12. A connecting rod, comprising a big end bearing eye for connection to a crankshaft, a small end bearing eye for connection to a piston of a cylinder, and an eccentric adjustment device for adjusting an effective connecting rod length, the eccentric adjustment device having an eccentric that interacts with an eccentric lever, and eccentric rods that engage on the eccentric lever, the eccentric lever having at least one eccentric lever segment positioned in front of and/or behind the small end bearing eye, as seen in an axial direction of the eccentric, the eccentric lever segment being connected for conjoint rotation to the eccentric, and ends of the eccentric lever segment that are connected to the eccentric rods having a contour indented in a direction of the eccentric rods.

13. The connecting rod of claim 12, wherein the at least one eccentric lever segment includes a first eccentric lever segment positioned in front of a first axial end face of the small end bearing eye and a second eccentric lever segment positioned in front of a second axial end face of the small end bearing eye, so that the small end bearing eye is between the two eccentric lever segments, connecting pins connecting the ends of the eccentric lever segments to the eccentric rods, surfaces of the eccentric lever segments that face the end faces of the small end bearing eye having an indented contour, reducing the distance between the eccentric lever segments.

14. The connecting rod of claim 13, wherein indentation lines at the ends of the eccentric lever segments are configured so that when an eccentric rod engaging on ends of the eccentric lever segments has entered to the maximum extent into a hydraulic chamber, the indentation lines at this end of the eccentric lever segments extend parallel to a connecting-rod main body contour facing the respective eccentric rod.

15. An internal combustion engine that has an adjustable compression ratio, comprising at least one cylinder, a crankshaft, on which at least one connecting rod engages, the connecting rod having a big end bearing eye connected to the crankshaft, a small end bearing eye connected to a piston of the cylinder, and an eccentric adjustment device for adjusting an effective connecting rod length, the eccentric adjustment device having an eccentric and an eccentric lever with eccentric lever segments positioned in front of and behind the small end bearing eye and being connected to the eccentric for conjoint rotation, end faces of the small end bearing eye positioned adjacent the respective eccentric lever segments and adjacent end faces of the eccentric each having beveled contours, and eccentric rods engaging on the eccentric lever and being acted upon by hydraulic pressure prevailing in hydraulic chambers.

* * * * *